(No Model.) 2 Sheets—Sheet 1.
J. M. HUFFMAN.
COMBINED PLANTER AND FERTILIZER DISTRIBUTER.
No. 346,548. Patented Aug. 3, 1886.
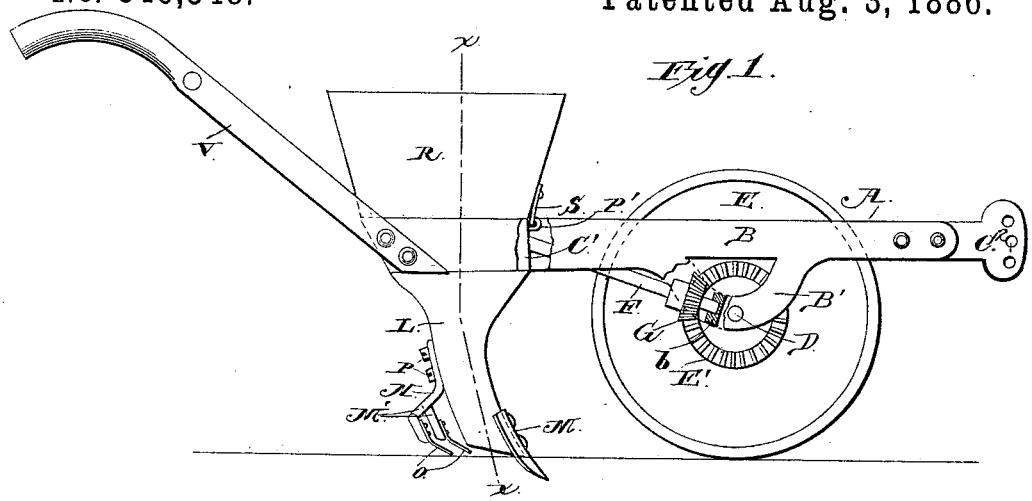
Fig. 1.
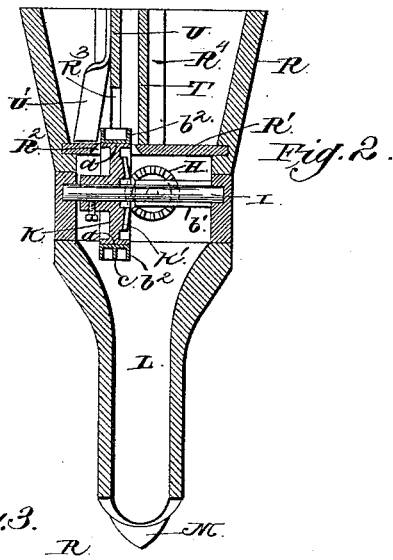
Fig. 2.
Fig. 3.
Witnesses
M. Fowler
J. W. Garner
Inventor
J. M. Huffman
By his Attorneys (No Model.) 2 Sheets—Sheet 2.

J. M. HUFFMAN.
COMBINED PLANTER AND FERTILIZER DISTRIBUTER.

No. 346,548. Patented Aug. 3, 1886.

Witnesses
Inventor
J. M. Huffman
By his Attorneys

N. PETERS, Photo-Lithographer, Washington, D. C.

United States Patent Office.

JEFFERSON MUNROW HUFFMAN, OF HICKORY, NORTH CAROLINA, ASSIGNOR OF ONE-THIRD TO F. B. ALEXANDER, OF SAME PLACE.

COMBINED PLANTER AND FERTILIZER-DISTRIBUTER.

SPECIFICATION forming part of Letters Patent No. 346,548, dated August 3, 1886.

Application filed March 19, 1886. Serial No. 195,838. (No model.)

*To all whom it may concern:*

Be it known that I, JEFFERSON MUNROW HUFFMAN, a citizen of the United States, residing at Hickory, in the county of Catawba and State of North Carolina, have invented a new and useful Improvement in a Combined Planter and Fertilizer-Distributer, of which the following is a specification, reference being had to the accompanying drawings.

My invention relates to an improvement in a combined planter and fertilizer-distributer; and it consists in the peculiar construction and combination of devices, that will be more fully set forth hereinafter, and particularly pointed out in the claim.

Figure 4:
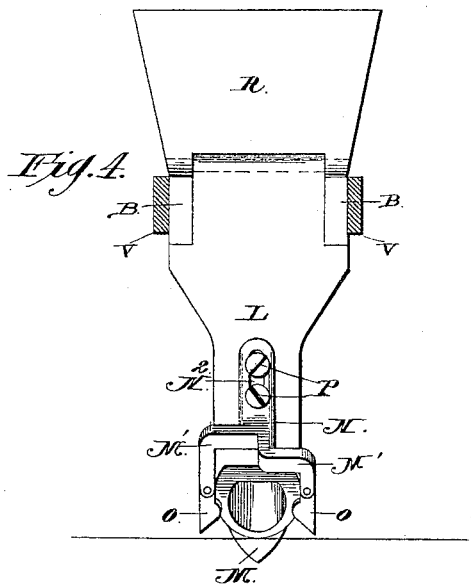
Figure 5:
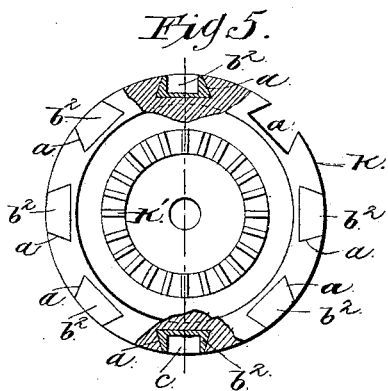
Figure 6:
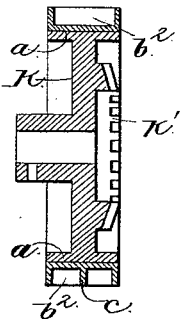

In the drawings, Figure 1 is a side elevation of my invention, partly in section. Fig. 2 is a detail transverse sectional view of the same, taken on the line $x\,x$ of Fig. 1. Fig. 3 is a top plan view, partly in section. Fig. 4 is a detail rear elevation of the covering-teeth and their securing-arms. Figs. 5 and 6 are detail views of the seed and fertilizer disk.

A represents the frame of the machine, which is composed of the side beams, B, and the transverse bars C and C'. The bar C at the front end of the frame is formed with or is provided with a clevis, C².

B' represents brackets, which depend from the lower sides of the beams, near the front ends thereof, and in the said brackets is journaled a shaft, D, to which is secured a driving-wheel, E. This wheel is provided on one side with gear-teeth E'. From the inner side of one of the brackets B' extends an arm, $b$, and from the inner side of one of the beams, near the rear end thereof, extends a similar arm, $b'$. In the said arms is journaled a shaft, F, which is provided at one end with a gear-pinion, G, that meshes with the teeth E', and to the rear upper end of the said shaft is fixed a gear-pinion, H.

I represents a transverse shaft, which is journaled between the beams B, near their rear ends, and to the said shaft is secured a combined seed and fertilizer disk, K, which is provided on one side with gear-teeth K', that mesh with the pinion H. The disk K is provided with a broad rim, in which at suitable regular intervals is made a number of transverse mortises, $a$.

$b^2$ represents a series of rectangular cups having inclined opposite sides dovetailed into the mortises $a$, and thereby secured on the periphery of the disk K. These seed-cups may be either formed with a single central opening, or provided with a longitudinal central partition, $c$, thereby dividing the cup into two parallel compartments.

L represents a hollow standard, which depends from the rear ends of the beams B, and thereby forms a seed-tube, in the upper end of which the disk K rotates. To the lower end of this hollow standard, on its front side, is secured a furrow-opener or shovel, M. To the rear side of the standard L is secured a vertically-movable bracket, N, having its lower end provided with laterally-extending arms M', to the downturned ends of which are attached covering teeth or shovels O, which latter are made of suitable resilient sheet metal. The bracket N is provided with a vertical slot, N², through which pass set-screws P, which enter the rear sides of the hollow standard L and secure the said bracket thereto, and enable it to be vertically adjusted with relation to the hollow standard L.

R represents a hopper having inclined downwardly-converging sides and ends and the bottom board, R'. This hopper has its rear end hinged on the rear upper sides of the beams B, and the front end of the hopper has a hook, S, that engages with a keeper, P', which is provided on the transverse bar C'. By means of this hook and keeper the hopper is secured firmly on the beams B above the upper end of the hollow standard. In one side of the bottom board, R', of the hopper is made an opening, R², through which projects the upper side of the disk K. The end walls of the hopper are provided with two pairs of vertical grooves, R³ R⁴, the latter of which are located in a line with the longitudinal center of the hopper, and the former are located in a line with the longitudinal center of the disk.

T represents a partition-board, which is adapted to be inserted in the grooves R⁴, and thereby divide the hopper into two compartments of equal size.

U represents a partition-board, which fits in the groove R³, and is narrower than the board T, so as not to extend to the bottom of the hopper. This board U aligns with the longitudinal center of the disk, and is provided on one side with a depending arm, U'.

V represents a pair of handles, similar in construction to plow-handles, which are attached to the rear end of the beams B.

The operation of my invention is as follows: When it is desired to plant seeds without fertilizer, the partition-board T is removed from the hopper and the board U is inserted in the grooves $R^4$, thereby causing the arm U' to bear on the upper side of the disk K. In the openings $a$ of the latter are inserted seed-cups, forming simply one compartment. As the machine is drawn across the field, the seeds in the hopper are fed therefrom by the rotating disk through the hollow standard L into the furrow made by the shovel M, and the seeds are covered by the spring-teeth O, which work in rear of the lower end of the said standard. The function of the arm U' is to scrape the upper side of the disk K and prevent any seeds from becoming clogged between the said disk and the sides of the opening $R^2$, and thereby cracked and destroyed. When it is desired to plant seeds with the fertilizer, the disk is provided with peripheral cups $b$, having two parallel compartments, as hereinbefore described, and the partition-board U is inserted in the grooves $R^3$ of the hopper. The larger compartment therein thus formed is filled with fertilizer, and the smaller compartment thereof is filled with seeds to be planted. As the lower edge of the board U aligns with the central partition of the divided cups $b$ in the disk, it will be readily understood that the compartments on one side of the said cups will be filled with fertilizer, and the compartments on the other side thereof will be filled with seeds as the disk rotates, thereby enabling the machine to plant seeds and fertilizer at the same time. By providing the disk K with any desired number of cups $b$, located at regular intervals, and fitting the intermediate openings, $a$, in the said disk with blanks—such as represented at $d$—the seeds may be planted at any desired distance apart.

Having thus described my invention, I claim—

In a planter, the combination of the hopper having the grooves $R^3$ and $R^4$, and the opening in its bottom, with the vertical rotating disk having its upper side projecting through the opening in the bottom of the hopper, and provided with the peripheral cups, and the partition-boards T and U, adapted to fit in the grooves $R^3$ and $R^4$ and divide the hopper into compartments, one of the said boards having the depending arm U, for the purpose set forth, substantially as described.

In testimony that I claim the foregoing as my own I have hereto affixed my signature in presence of two witnesses.

JEFFERSON MUNROW HUFFMAN.

Witnesses:
F. L. CLINE,
F. B. ALEXANDER.